(12) United States Patent
Ishimatsu

(10) Patent No.: US 12,103,350 B2
(45) Date of Patent: Oct. 1, 2024

(54) AXLE BEAM TYPE SUSPENSION

(71) Applicant: HONDA MOTOR CO., LTD., Tokyo (JP)

(72) Inventor: Hisashi Ishimatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/460,195

(22) Filed: Sep. 1, 2023

(65) Prior Publication Data
US 2024/0109391 A1    Apr. 4, 2024

(30) Foreign Application Priority Data

Sep. 29, 2022 (JP) ................. 2022-155643

(51) Int. Cl.
*B60G 21/05*    (2006.01)
(52) U.S. Cl.
CPC ...... *B60G 21/052* (2013.01); *B60G 2200/342* (2013.01); *B60G 2204/422* (2013.01)
(58) Field of Classification Search
CPC ........ B60G 2204/421; B60G 2204/422; B60G 21/052; B60G 2200/34; B60G 2200/342
See application file for complete search history.

(56) References Cited

U.S. PATENT DOCUMENTS

| | | | | | |
|---|---|---|---|---|---|
| 5,566,969 | A | * | 10/1996 | Tattermusch | .......... B60G 9/027 280/124.117 |
| 6,142,494 | A | * | 11/2000 | Higuchi | ................... B60G 3/28 280/124.135 |
| 7,695,054 | B2 | * | 4/2010 | Haeusler | ............... B60G 99/002 296/190.07 |
| 8,177,245 | B2 | * | 5/2012 | Bitz | ..................... B60G 21/053 280/124.128 |
| 8,348,334 | B2 | * | 1/2013 | Lorenz | ............... B62D 33/0608 296/190.07 |
| 8,590,911 | B2 | * | 11/2013 | Ehrlich | ................ B60G 21/051 280/124.128 |

(Continued)

FOREIGN PATENT DOCUMENTS

| | | | | | |
|---|---|---|---|---|---|
| DE | 102012000325 | A1 | * | 7/2013 | ........... B60G 21/051 |
| DE | 102012106951 | A1 | * | 1/2014 | ............. B60G 11/10 |

(Continued)

*Primary Examiner* — Paul N Dickson
*Assistant Examiner* — Maxwell L Meshaka
(74) *Attorney, Agent, or Firm* — Rankin, Hill & Clark LLP

(57) ABSTRACT

The axle beam type suspension includes: the pair of trailing arms extending in the front-rear direction with the respective front end sections supported on the vehicle body and the respective rear end sections coupled to the wheels; the axle beam extending in the vehicle width direction and coupling the pair of trailing arms to each other; the pair of Watt's linkage mechanisms extending in the vehicle width direction, coupling the pair of trailing arms to each other at a position rearward of the axle beam, and fixed at a middle part to the vehicle body; and the inner shafts as connection members connecting the vehicle-width-direction outer end portions of one of the pair of Watt's linkage mechanisms and the other Watt's linkage mechanism. The inner shafts are characterized in that they are fixed to the trailing arms via the elastic members surrounding the inner shafts.

4 Claims, 6 Drawing Sheets

(56) References Cited

U.S. PATENT DOCUMENTS

| | | | | |
|---|---|---|---|---|
| 8,608,234 | B2* | 12/2013 | Haeusler | B62D 33/0604 |
| | | | | 296/190.07 |
| 8,696,002 | B1* | 4/2014 | Batdorff | B60G 9/00 |
| | | | | 280/5.509 |
| 10,144,260 | B2* | 12/2018 | Durkovic | B60G 15/06 |
| 10,836,425 | B2* | 11/2020 | Yamazaki | B62D 5/006 |
| 2007/0056787 | A1* | 3/2007 | Haeusler | B60G 99/002 |
| | | | | 180/89.13 |
| 2010/0052281 | A1* | 3/2010 | Bitz | B60G 21/053 |
| | | | | 280/124.106 |
| 2011/0031712 | A1* | 2/2011 | Bitz | B60G 21/052 |
| | | | | 280/124.106 |
| 2011/0095569 | A1 | 4/2011 | Haeusler et al. | |
| 2013/0042464 | A1* | 2/2013 | Orcutt | B23P 6/00 |
| | | | | 29/525.11 |
| 2017/0253099 | A1* | 9/2017 | Durkovic | B60G 15/06 |
| 2023/0286349 | A1* | 9/2023 | Ishimatsu | B60G 21/051 |

FOREIGN PATENT DOCUMENTS

| | | | | |
|---|---|---|---|---|
| JP | H06127231 A | * | 5/1994 | |
| JP | 2011-525451 A | | 9/2011 | |
| WO | WO-2024037934 A1 | * | 2/2024 | B60G 9/003 |

* cited by examiner

AXLE BEAM TYPE SUSPENSION

BACKGROUND OF THE INVENTION

1. Field of the Invention

The present invention relates to an axle beam type suspension using Watt's linkage mechanisms attached to multiple rods arranged parallel to an axle beam extending in a vehicle width direction at a position inward of wheels on opposite sides of a vehicle body.

2. Description of the Related Art

In recent years, there has been a growing effort to provide access to sustainable transportation systems that take vulnerable road users among traffic participants, such as the elderly, people with disabilities, and children, into account. Toward this end, there has been research and development focused on further improving traffic safety and convenience through the development of vehicle behavior stability.

The configuration disclosed in Patent Literature 1 is conventional art of an axle beam type suspension using Watt's linkage mechanisms. The configuration of Patent Literature 1 includes two Watt's linkage (or Watt linkage) mechanisms disposed next to each other in the up-down direction. Each Watt's linkage mechanism includes multiple thrust rods extending in the transverse direction (vehicle width direction). The configuration is such that the length of at least one transverse thrust rod of one of the Watt's linkage mechanisms is variable, and the length is changed by an actuator. This configuration has joints for the multiple transverse thrust rods of both Watt's linkage mechanisms. The joints serve as pivotal attachment points on outer sides in the vehicle width direction and are form a pair located at pivot axes shared by both Watt's linkage mechanisms. Pivot shafts for pairs of commonly pivotally attached or integrally formed transverse thrust rods are elastically linked to a mass body or an understructure of the vehicle. This configuration allows the multiple thrust rods to operate in a variable fashion.

PRIOR ART DOCUMENT(S)

Patent Literature(s)

Patent Literature 1: JP2011-525451A

SUMMARY OF THE INVENTION

Incidentally, the configuration of Patent Literature 1 has a problem in vehicle behavior stability that the multiple thrust rods of the Watt's linkages tend to interfere with one another when the Watt's linkage mechanisms are actuated.

The present invention has been made in view of such circumstances, and an object thereof is to provide an axle beam type suspension capable of preventing interference between multiple Watt's linkages with a simple configuration. As a result, the present invention contributes to development of a sustainable transportation system.

An axle beam type suspension of the present invention to achieve the object includes: a pair of trailing arms extending in a front-rear direction with respective front end sections supported on a vehicle body and respective rear end sections coupled to wheels; an axle beam extending in a vehicle width direction and coupling the pair of trailing arms to each other; a pair of Watt's linkage mechanisms extending in the vehicle width direction, coupling the pair of trailing arms to each other at a position rearward of the axle beam, and fixed at a middle part to the vehicle body; and a connection member connecting a vehicle-width-direction outer end portion of one of the pair of Watt's linkage mechanisms and a vehicle-width-direction outer end portion of the other Watt's linkage mechanism, in which the connection member is fixed to the trailing arms via an elastic member surrounding the connection member.

The present invention can prevent interference between multiple Watt's linkages of an axle beam type suspension with a simple configuration. As a result, the present invention contributes to development of a sustainable transportation system.

DETAILED DESCRIPTION OF THE EMBODIMENT

Configuration in Embodiment

An embodiment of the present invention will be described in detail with reference to FIGS. 1 to 6. In the description, the same elements are denoted by the same reference signs, and overlapping description is omitted. Also, in drawings, "FRONT" and "REAR" indicated by arrows represent the front-rear direction of an automobile (not shown), "LEFT" and "RIGHT" represent the width direction of the automobile, and "UP" and "DOWN" represent the vertical, up-down direction.

Figure 1:
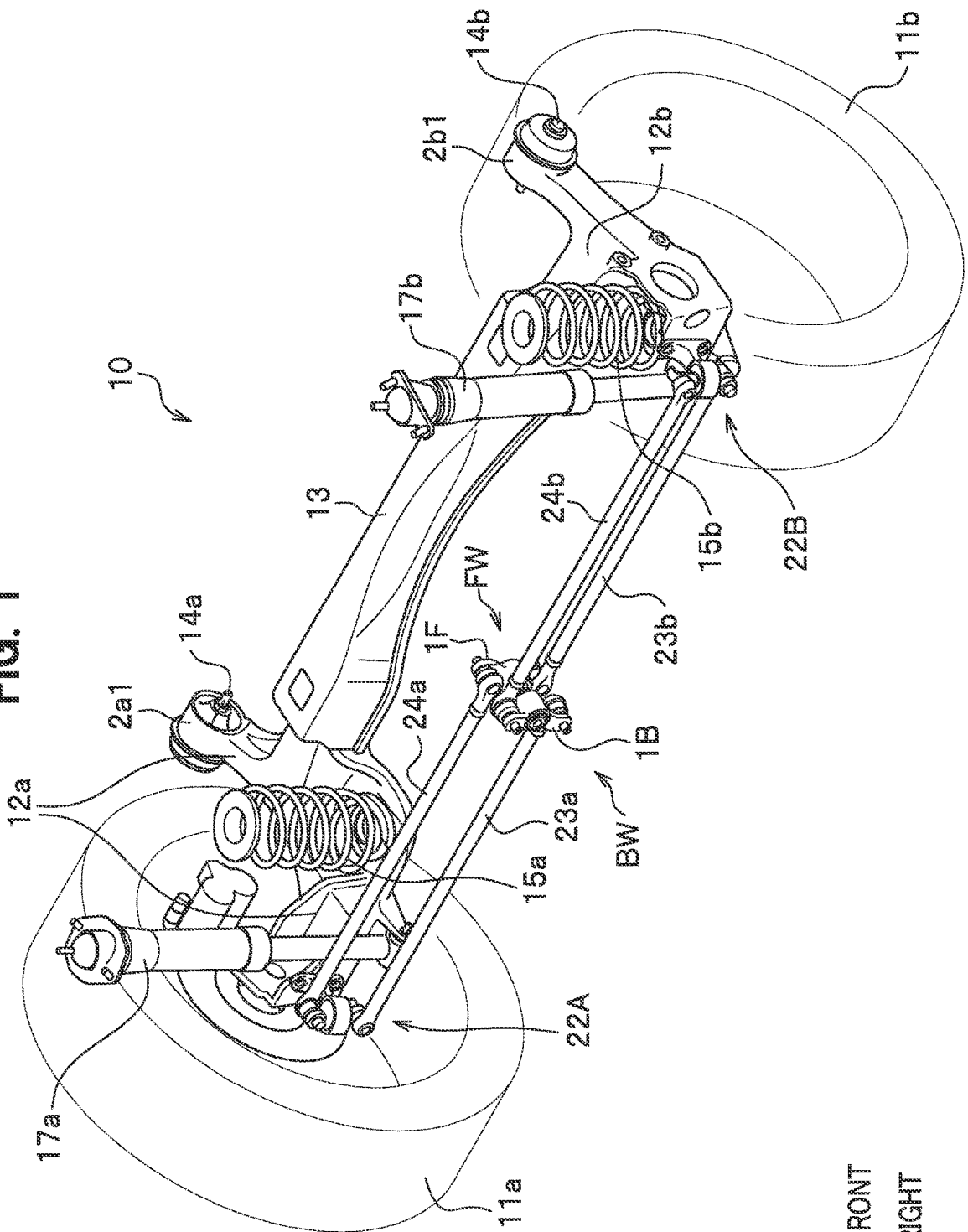
FIG. 1 is a perspective view showing a configuration of an axle beam type suspension in an embodiment.

FIG. 1 is a perspective view showing a configuration of an axle beam type suspension in the present embodiment. An axle beam type suspension 10 shown in FIG. 1 includes a pair of left and right trailing arms 12a and 12b coupled to the inner sides of a pair of wheels 11a and 11b and extending toward the front of the vehicle, the pair of wheels 11a and 11b being disposed on the rear side of the vehicle and the opposite sides in the vehicle width direction. In other words, the pair of trailing arms 12a and 12b extend in the front-rear direction with their front end sections supported on the vehicle body and their rear end sections coupled to the wheels 11a and 11b. The pair of trailing arms 12a and 12b are at the left and right of the vehicle separated from each other, and coupled by an axle beam 13 extending in the vehicle width direction. Coil springs 15a and 15b which absorb up-down movements of the vehicle are arranged on portions of the left and right trailing arms 12a and 12b closer to the rear of the vehicle. On a further rear side, rod-shaped shock absorbers 17a and 17b are arranged which control the movement of the suspension so as to create smooth ride comfort and stable steerability of the vehicle.

Compliance bushes (also referred to as bushes) 14a and 14b, which are attached to the vehicle body, are fixed to the front end sections of the left and right trailing arms 12a and 12b. The bushes 14a and 14b use elastic members made of rubber or the like and suppress vibration due to a later-described in-phase movement or reverse-phase movement that occurs when the vehicle moves over a step. The left and right bushes 14a and 14b are inserted through cylindrical portions 2a1 and 2b1 at the front end sections of the trailing arms 12a and 12b, the cylindrical portions 2a1 and 2b1 having a substantially cylindrical shape.

Now, the in-phase movement and the reverse-phase movement will be described. "In-phase movement" refers to the wheels 11a and 11b on both sides moving in the same up-down direction in a situation such as when the vehicle moves over a step, for example. "Reverse-phase movement" refers to the wheels 11a and 11b on both sides moving in opposite up-down directions in a situation such as when the vehicle rolls, for example.

Outer end portions 22A and 22B of a pair of front and rear Watt's linkage mechanisms FW and BW (described later) provided so as to extend in the vehicle width direction (hereinafter referred to as "vehicle-width-direction outer end portions 22A and 22B") are fixed to the rear end sections of the left and right trailing arms 12a and 12b, respectively. Specifically, end portions of two upper and lower rods 24a and 23a extending leftward in the vehicle width direction from middle links 1F and 1B of the pair of front and rear Watt's linkage mechanisms FW and BW will be referred to as the vehicle-width-direction outer end portion 22A, and end portions of two upper and lower rods 24b and 23b extending rightward in the vehicle width direction from the middle links 1F and 1B of the pair of front and rear Watt's linkage mechanisms FW and BW will be referred to as the vehicle-width-direction outer end portion 22B.

Of the pair of front and rear Watt's linkage mechanisms, the Watt's linkage mechanism FW closer to the front of the vehicle will be referred to as the front Watt's linkage mechanism FW, and the Watt's linkage mechanism BW closer to the rear of the vehicle will be referred to as the rear Watt's linkage mechanism BW. Both of the pair of front and rear Watt's linkage mechanisms FW and BW will be referred to also as the front-rear Watt's linkage mechanisms FW and BW. The front Watt's linkage mechanism FW includes the left upper rod 24a, the right lower rod 23b, and the middle link 1F disposed therebetween. The rear Watt's linkage mechanism BW includes the left lower rod 23a, the right upper rod 24b, and the middle link 1B disposed therebetween.

Figure 2:
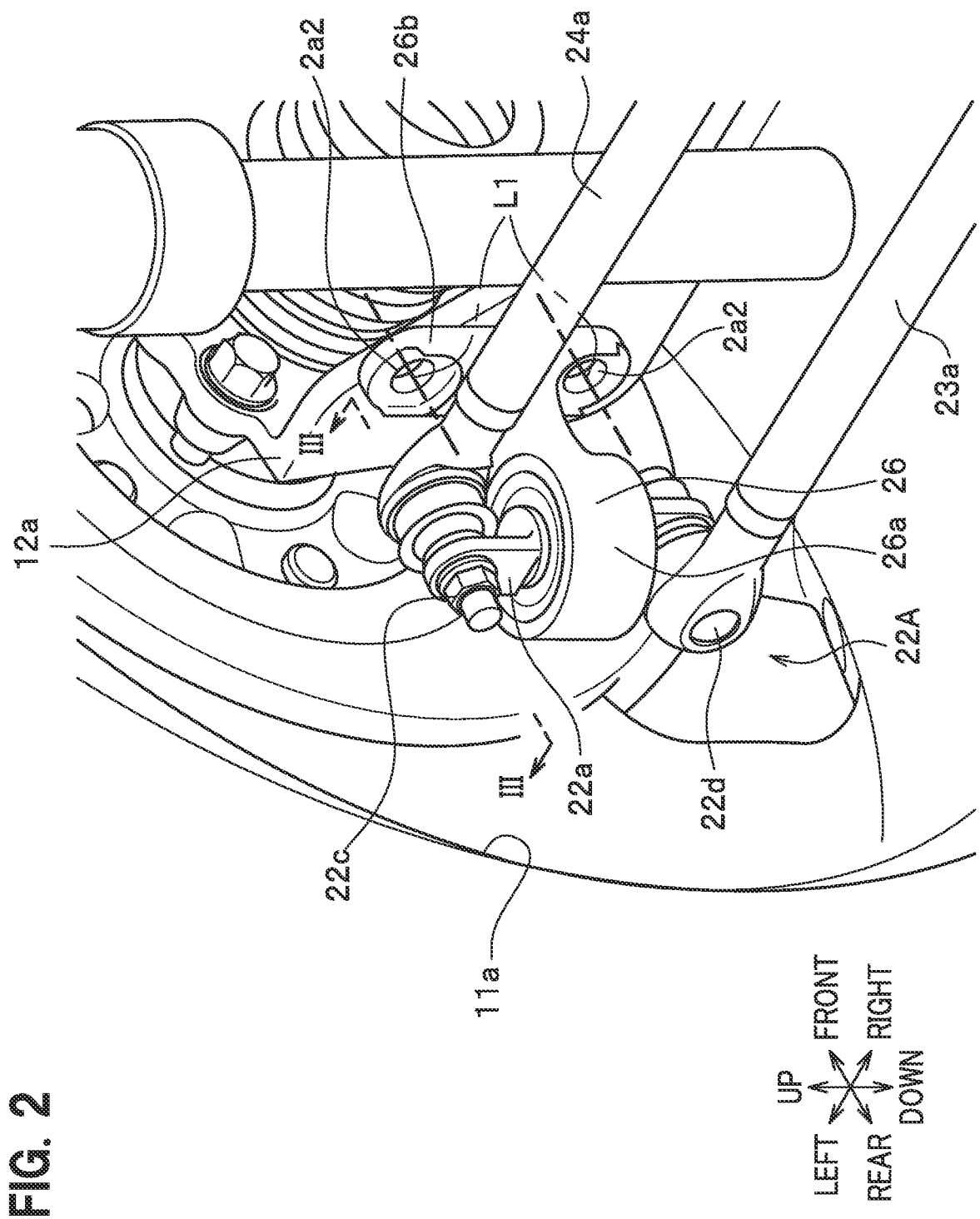
FIG. 2 is a perspective view showing a configuration of a left Watt's linkage.

The configuration around the left vehicle-width-direction outer end portion 22A shown in FIG. 2 will be representatively described as configurations of the front-rear Watt's linkage mechanisms FW and BW around the vehicle-width-direction outer end portions 22A and 22B. The vehicle-width-direction outer end portion 22A is held by a bracket 26 fixed to the rear end of the trailing arm 12a and extending toward the rear of the vehicle. An attachment part 26b of the bracket 26 extending toward the front of the vehicle from a cylindrical part 26a opening in the up-down direction is fixed to the rear end of the trailing arm 12a with bolts (not shown). The bolts are screwed to threaded holes located in upper and lower portions of the attachment part 26b as indicated by two dashed lines L1 horizontally extending toward the front of the vehicle. The connection structure for the vehicle-width-direction outer end portion 22A includes: an inner shaft 22a inserted through the cylindrical part 26a in the up-down direction; and upper and lower ball joints 22c and 22d which are mounted to upper and lower portions of the inner shaft 22a and to which the vehicle-width-direction outer end portion 22A, formed of end portions of the two rods 23a and 24a, is coupled. The inner shaft 22a connects the vehicle-width-direction outer end portion 22A of the rear Watt's linkage mechanism BW (the end portion of the rod 23a) and the vehicle-width-direction outer end portion 22A of the front Watt's linkage mechanism FW (the end portion of the rod 24a) to each other in the up-down direction. Note that the inner shaft 22a forms the connection member described in claims.

At the left vehicle-width-direction outer end portion 22A, the left upper rod 24a of the front Watt's linkage mechanism FW is connected to the upper ball joint 22c, and the left lower rod 23a of the rear Watt's linkage mechanism BW is connected to the lower ball joint 22d. At the right vehicle-width-direction outer end portion 22B (see FIG. 1), the right upper rod 24b of the rear Watt's linkage mechanism BW is connected to the upper ball joint 22c, and the right lower rod 23b of the front Watt's linkage mechanism FW is connected to the lower ball joint 22d.

Figure 3:
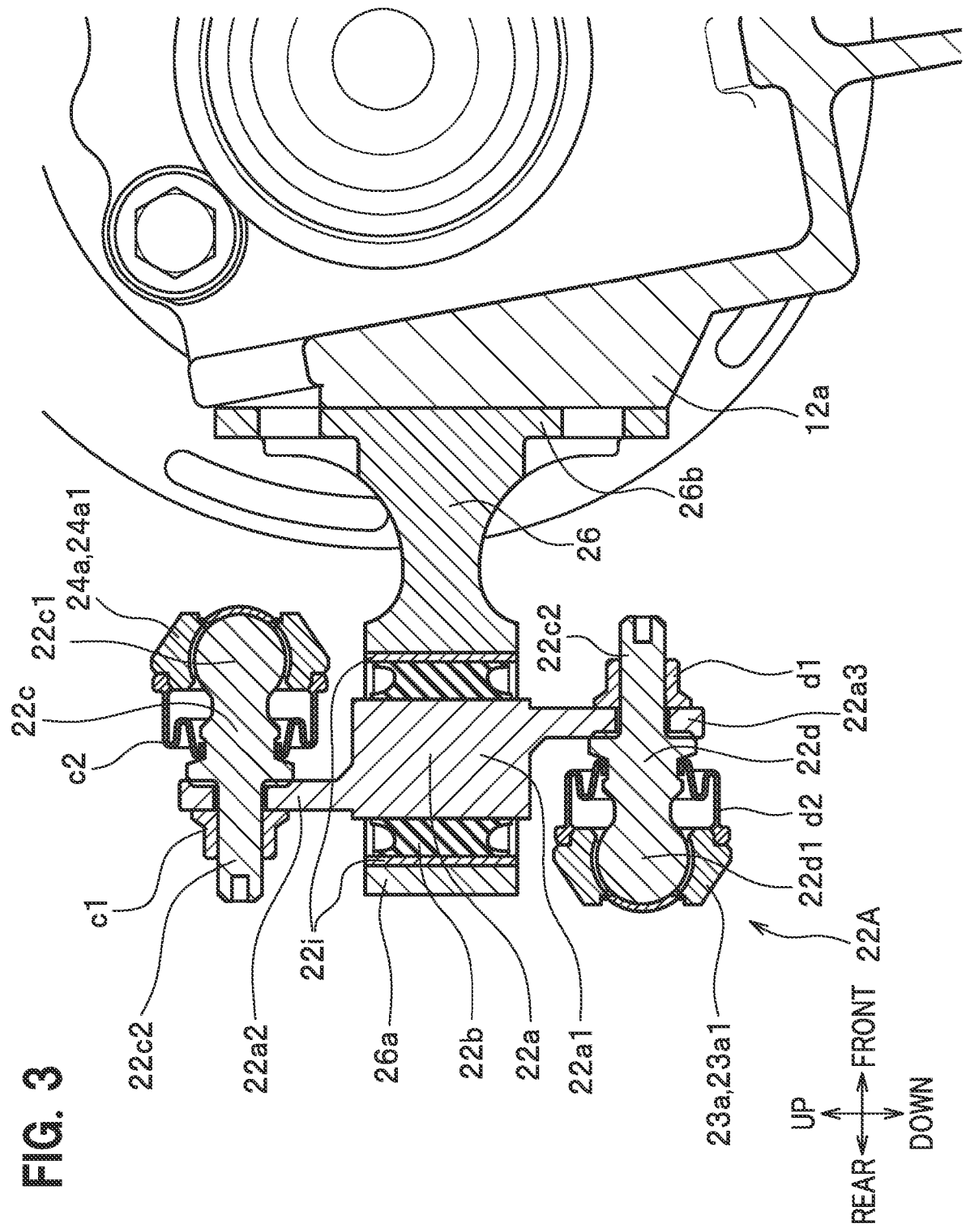
FIG. 3 is a cross-sectional view of the Watt's linkage along the line shown in FIG. 2.

The vehicle-width-direction outer end portion 22A will further be described in detail with reference to FIG. 3. FIG. 3 is a cross-sectional view of the vehicle-width-direction outer end portion 22A along the III-III line shown in FIG. 2. The inner shaft 22a has a crank shape with a body part 22a1 and shafts 22a2 and 22a3 protruding upward and downward from rear and front positions on upper and lower end surfaces of the body 22a1, respectively. The upper and lower shafts 22a2 and 22a3 are offset from each other in the front-rear direction.

The body part 22a1 is inserted through the hollow portion of the cylindrical part 26a of the bracket 26 in the up-down direction. An elastic member 22b made of rubber or the like is placed around the inserted body part 22a1, so that the inner shaft 22a is held in the hollow portion of the cylindrical part 26a so as to be capable of making a swinging movement to be described later. In other words, the inner shaft 22a is held on the bracket 26 via the elastic member 22b so as to be capable of making the swinging movement. The inner shaft 22a, the elastic member 22b, and an outer tube 22i form a bush with a central axis extending in the up-down direction. This bush is fitted in the cylindrical part 26a. The swinging movement refers to a movement of the inner shaft 22a such as tilting in the front-rear, left-right, and up-down directions and turning with elastic deformation of the elastic member 22b. The upper shaft 22a2 forms the upper coupling part described in a claim. The lower shaft 22a3 forms the lower coupling part described in the claim.

A through-hole is bored through the upper shaft 22a2 of the inner shaft 22a in the vehicle front-rear direction. A shaft part 22c2 protruding from a ball part 22c1 of the upper ball joint 22c is inserted through this through-hole toward the rear of the vehicle. The projecting portion of the inserted shaft part 22c2 is held by a holding member c1. An elastic member c2 made of rubber or the like is wound circumferentially around a portion of the ball joint 22c near the root of the ball part 22c1. A left end portion 24a1 of the left rod 24a is attached to the ball joint 22c so as to cover the ball part 22c1 in abutment with the elastic member c2. This attachment renders the left end portion 24a1 of the rod 24a turnable (swingable) along the spherical surface of the ball part 22c1.

Similarly, a through-hole is bored through the lower shaft 22a3 of the inner shaft 22a in the vehicle front-rear direction. A shaft part 22c2 of the lower ball joint 22d is inserted through this through-hole toward the front of the vehicle.

The projecting portion of the inserted shaft part 22c2 is held by a holding member d1. An elastic member d2 made of rubber or the like is wound circumferentially around a portion of the ball joint 22d near the root of a ball part 22d1. A left end portion 23a1 of the left rod 23a is attached to the ball joint 22d so as to cover the ball part 22d1 in abutment with the elastic member d2. This attachment renders the left end portion 23a1 of the rod 23a turnable (swingable) along the spherical surface of the ball part 22d1.

Figure 4:
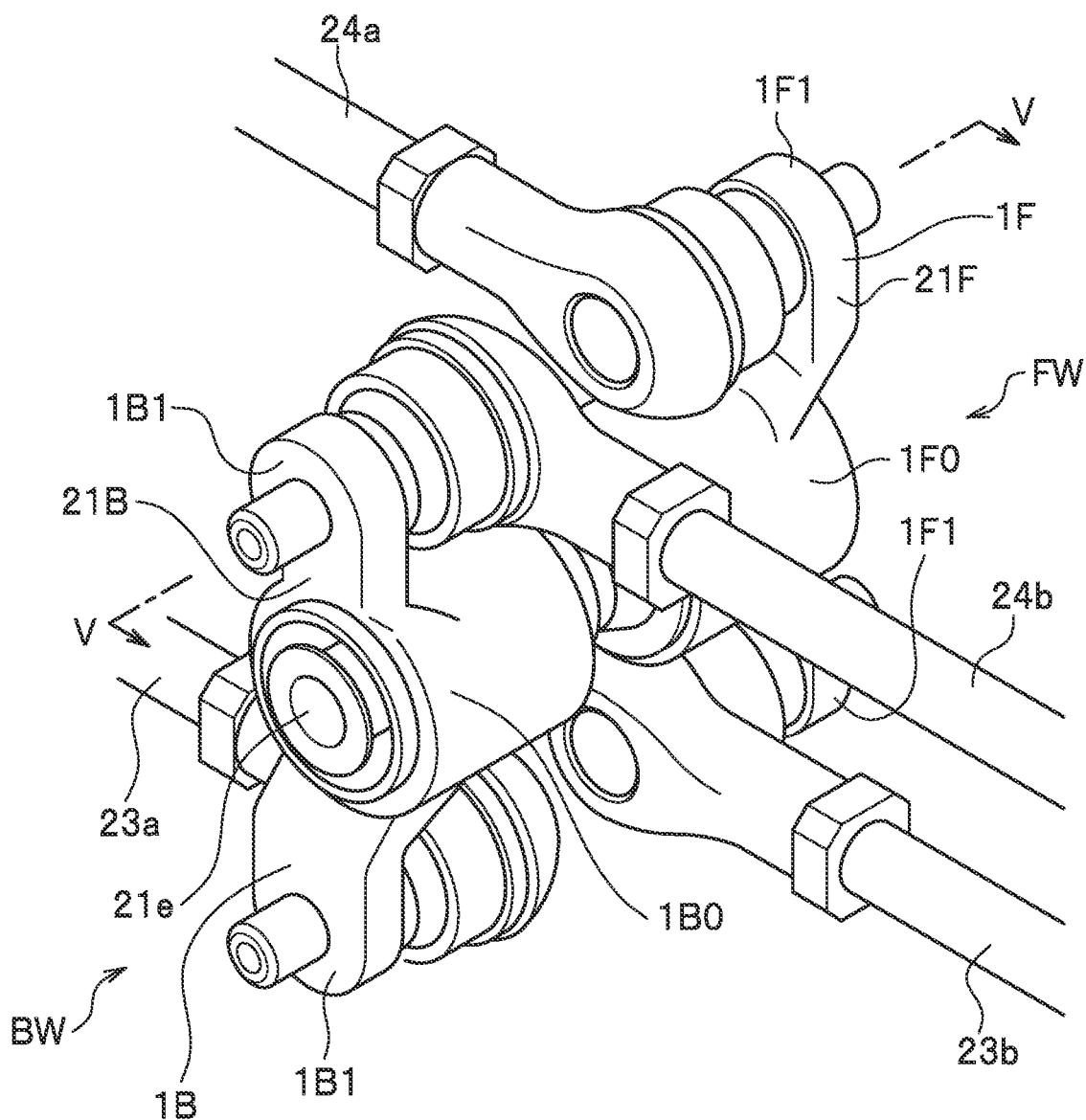
FIG. 4 is a perspective view showing a structure of Watt's linkage mechanisms.

FIG. 4 is a perspective view showing a structure of a middle part of the Watt's linkage mechanisms FW and BW. As shown in FIG. 4, the middle part of the Watt's linkage mechanisms FW and BW includes the front middle link 1F and the rear middle link 1B arranged to be separated from each other in the vehicle front-rear direction. The rear middle link 1B includes a cylindrical body part 1B0 of a cylindrical shape extending in the vehicle front-rear direction, and extending parts 1B1 extending upward and downward from a rear end section of the outer periphery of the cylindrical body part 1B0. The front middle link 1F includes a cylindrical body part 1F0 of a cylindrical shape extending in the vehicle front-rear direction, and extending parts 1F1 extending upward and downward from a rear end section of the outer periphery of the cylindrical body part 1F0. A rotary shaft part 21e (see FIG. 5) which couples the front and rear middle links 1F and 1B to each other coaxially is inserted through the hollow portions of the cylindrical body parts 1B0 and 1F0 formed therethrough.

Figure 5:
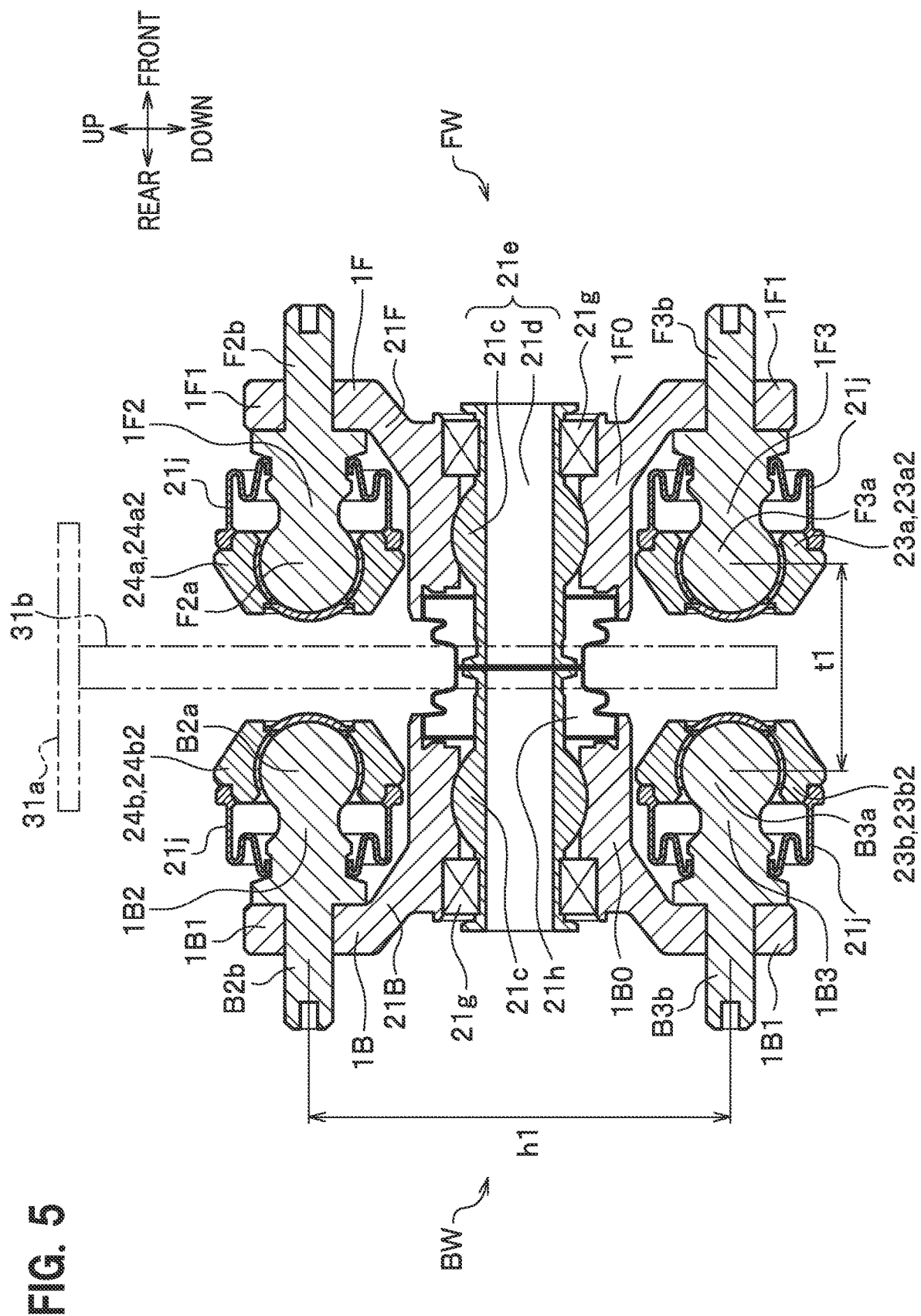
FIG. 5 is a cross-sectional view along the V-V line shown in FIG. 4.

As shown in FIG. 5, which is a cross-sectional view along the V-V line in FIG. 4, the rotary shaft part 21e has a horizontally elongated cylindrical shape 21d with ball-shaped pillow balls 21c circumferentially surrounding the outer peripheral surface of the cylindrical shape 21d and integrally arranged at separated positions.

The rotary shaft part 21e is inserted through the hollow portions of the middle links 1F and 1B of the front-rear Watt's linkage mechanisms FW and BW with bearing sheets 21g interposed therebetween. The bearing sheets 21g are arranged near the front end and the rear end. By inserting the rotary shaft part 21e in this manner, one of the pillow balls 21c is arranged inside the cylindrical body part 1F0 of the front middle link 1F, and the other pillow ball 21c is arranged inside the cylindrical body part 1B0 of the rear middle link 1B. A coupling part 21h that couples the front and rear middle links 1F and 1B to each other is arranged at a section where they are separated from each other.

A through-hole is bored through the upper extending part 1F1 of the front middle link 1F in the vehicle front-rear direction. A shaft part F2b protruding from a ball part F2a of a ball joint 1F2 is inserted through this through-hole toward the front of the vehicle. An elastic member 21j made of rubber or the like is wound circumferentially around a portion near the root of the ball part F2a. A right end portion 24a2 of the left rod 24a (see FIG. 1) is attached to the ball joint 1F2 so as to cover the ball part F2a in abutment with the elastic member 21j. This attachment renders the right end portion 24a2 of the rod 24a turnable (swingable) along the spherical surface of the ball part F2a.

A through-hole is bored through the lower extending part 1F1 of the front middle link 1F in the vehicle front-rear direction. A shaft part F3b of a ball joint 1F3 is inserted through this through-hole toward the front of the vehicle. An elastic member 21j made of rubber or the like is wound circumferentially around a portion near the root of a ball part F3a. A right end portion 23a2 of the left rod 23a (see FIG. 1) is attached to the ball joint 1F3 so as to cover the ball part F3a in abutment with the elastic member 21j. This attachment renders the right end portion 23a2 of the rod 23a turnable (swingable) along the spherical surface of the ball part F3a.

A through-hole is bored through the upper extending part 1B1 of the rear middle link 1B in the vehicle front-rear direction. A shaft part B2b of a ball joint 1B2 is inserted through this through-hole toward the rear of the vehicle. An elastic member 21j made of rubber or the like is wound circumferentially around a portion near the root of a ball part B2a. A left end portion 24b2 of the right rod 24a (see FIG. 1) is attached to the ball joint 1B2 so as to cover the ball part B2a in abutment with the elastic member 21j. This attachment renders the left end portion 24b2 of the rod 24b turnable (swingable) along the spherical surface of the ball part B2a.

A through-hole is bored through the lower extending part 1B1 of the rear middle link 1B in the vehicle front-rear direction. A shaft part B3b of a ball joint 1B3 is inserted through this through-hole toward the rear of the vehicle. An elastic member 21j made of rubber or the like is wound circumferentially around a portion near the root of a ball part B3a. A left end portion 23b2 of the right rod 23b (see FIG. 1) is attached to the ball joint 1B3 so as to cover the ball part B3a in abutment with the elastic member 21j. This attachment renders the left end portion 23b2 of the rod 23b turnable (swingable) along the spherical surface of the ball part B3a.

The front-rear Watt's linkage mechanisms FW and BW are such that the rotary shaft part 21e inserted coaxially through the hollow portions of the middle links 1F and 1B is joined to the vehicle body via T-shaped brackets 31a and 31b. The bracket 31a extending horizontally is joined to the vehicle body. The lower side of the bracket 31b extending downward from the center of the horizontal bracket 31a is joined to the center of the rotary shaft part 21e. When the center of the rotary shaft part 21e of the front-rear Watt's linkage mechanisms FW and BW is fixed to the vehicle body via the vertical bracket 31b as described above, the front-rear Watt's linkage mechanisms FW and BW at the center in the vehicle width direction shown in FIG. 1 move in synchronization with the vehicle body, whereas the left and right vehicle-width-direction outer end portions 22A and 22B move in synchronization with the wheels.

The configuration in which the left and right vehicle-width-direction outer end portions 22A and 22B connected to the left and right trailing arms 12a and 12b are connected to each other by the pair of left and right rods 23a and 24b and the pair of left and right rods 23b and 24a with the middle links 1F and 1B therebetween as described above operates as below during an in-phase or reverse-phase movement.

Like common Watt's linkage mechanisms, the Watt's linkage mechanisms FW and BW according to the present embodiment have a function of preventing the entire axle beam type suspension from moving in the vehicle width direction when the left and right wheels make an in-phase or reverse-phase movement. In the present embodiment, these Watt's linkage mechanisms FW and BW are provided as a pair of mechanisms along the front-rear direction. This makes it possible to enhance the function of preventing the movement of the suspension in the vehicle width direction while achieving space saving.

Figure 6:
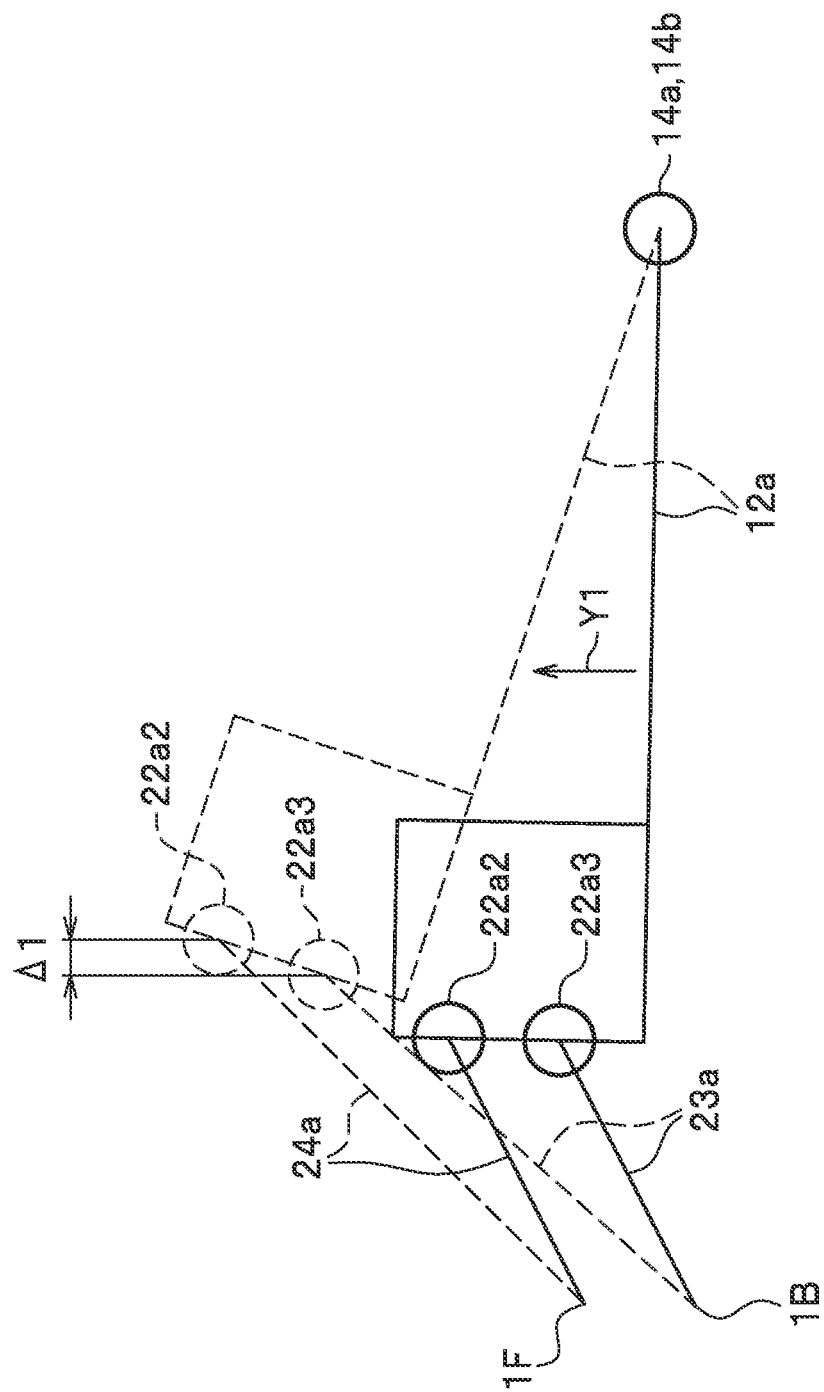
FIG. 6 is a schematic view of a left suspension on a vehicle body as seen from a side.

Now, the movement of the left vehicle-width-direction outer end portion 22A of the pair of front and rear Watt's linkage mechanisms FW and BW will be exemplarily described with reference to the schematic view of FIG. 6. FIG. 6 is a schematic view of the left suspension on the vehicle body. The solid lines show a state where the vehicle is traveling on a flat road surface whereas the dashed lines show a state where the vehicle has run on to a step and the suspension has shifted upward.

For example, as shown in FIG. 6, when the rear end section of the trailing arm 12a shifts upward about the compliance bush 14a on the front end section as a pivot center, the outer end portions of the rods 23a and 24a of the Watt's linkage mechanisms FW and BW pivot upward as well. The outer end portions of the rods 23a and 24a are connected to each other in the up-down direction by the shafts 22a2 and 22a3 of the inner shaft 22a. As a result, a link length difference Δ1 is generated in the front-rear direction between the outer end portions of the rods 23a and 24a, which can cause excessive constraint.

In the present invention, as shown in FIG. 3, the vehicle-width-direction outer end portion 22A of the Watt's linkage mechanisms FW and BW is connected to a connection member (the upper and lower shafts 22a2 and 22a3 of the inner shaft 22a), and its outer periphery is surrounded with the elastic member 22b (bush). Hence, the bush allows the connection member to move in a twisting manner, thereby absorbing the link length difference Δ1. This solves the excessive constraint of the Watt's linkage mechanisms FW and BW.

Advantageous Effects of Embodiment

Next, characteristic configurations of the axle beam type suspension in the present embodiment described above and their advantageous effects will be described.

(1) The axle beam type suspension 10 includes: the pair of trailing arms 12a and 12b extending in the front-rear direction with the respective front end sections supported on the vehicle body and the respective rear end sections coupled to the wheels; the axle beam 13 extending in the vehicle width direction and coupling the pair of trailing arms 12a and 12b to each other; the pair of Watt's linkage mechanisms FW and BW extending in the vehicle width direction, coupling the pair of trailing arms 12a and 12b to each other at a position rearward of the axle beam 13, and fixed at a middle part to the vehicle body; and the inner shafts 22a as connection members connecting the vehicle-width-direction outer end portion 22A of one of the pair of Watt's linkage mechanisms, namely, the Watt's linkage mechanism FW, and the vehicle-width-direction outer end portion 22B of the other Watt's linkage mechanism BW. The inner shafts 22a are characterized in that they are fixed to the trailing arms 12a via the elastic members 22b surrounding the inner shafts 22a.

This configuration allows for the following advantageous effect. In an in-phase or reverse-phase movement when the vehicle moves over a step, the vehicle-width-direction outer end portions 22A and 22B of the front-rear Watt's linkage mechanisms FW and BW may be pulled in a stretching direction by both or one of the wheels 11a and 11b, thereby generating the link length difference Δ1 (see FIG. 6). In this case, the elastic members 22b allow the inner shafts 22a at the left and right vehicle-width-direction outer end portions 22A and 22B to swing, thereby absorbing the link length difference Δ1. Accordingly, interference between the Watt's linkage mechanisms FW and BW due to excessive constraint of the vehicle-width-direction outer end portions 22A and 22B is prevented. This enables smooth movements of the Watt's linkage mechanisms FW and BW and also smooth movements of suspension parts not shown that are linked to the vehicle-width-direction outer end portions 22A and 22B.

This in turn prevents damage to the Watt's linkage mechanisms FW and BW and other parts.

(2) The axle beam type suspension 10 includes the brackets 26 fixed to the rear end sections of the trailing arms 12a and 12b and having hollow portions. The inner shafts 22a at the left and right vehicle-width-direction outer end portions 22A and 22B are characterized in that the inner shafts 22a are held in the hollow portions of the brackets 26 via the elastic members 22b surrounding the inner shafts 22a.

With this configuration, the elastic members 22b render the inner shafts 22a swingable. The brackets 26 are provided as separate components. This eliminates the need to provide protruding parts like the brackets on the trailing arms 12a and 12b. Accordingly, the trailing arms 12a and 12b can be downsized. The downsizing makes the manufacturing easier. As a result, it is possible to make the trailing arms 12a and 12b lighter while enhancing the degree of freedom in design and the versatility of the trailing arms 12a and 12b, i.e., enhancing the adjustability to differences in specifications such as whether the brackets 26 are present or not and whether the shapes of the trailing arms 12a and 12b are changed.

(3) The pair of Watt's linkage mechanisms FW and BW are disposed so as to be aligned in the front-rear direction, and the inner shafts 22a as the connection members each include: the body part 22a1 held via the elastic member 22b surrounding the body part 22a1; the shaft 22a2 as an upper coupling part which extends upward from the body part 22a1 and to which the vehicle-width-direction outer end portion 22A of the one Watt's linkage mechanism FW is coupled; and the shaft 22a3 as a lower coupling part which extends downward from the body part 22a1 and to which the vehicle-width-direction outer end portion 22A of the other Watt's linkage mechanism BW is coupled. The upper and lower shafts 22a2 and 22a3 characterized in that they are offset from each other in the front-rear direction.

With this configuration, as shown in FIG. 3, the inner shafts 22a have a crank shape with the upper and lower shafts 22a2 and 22a3 offset from each other. Accordingly, the gap between the ball joints 22c and 22d in the vehicle front-rear direction is shorter than when the upper and lower shafts 22a2 and 22a3 extend in the up-down direction at the same position. When the upper and lower shafts 22a2 and 22a3 extend in the up-down direction at the same position, the gap between the ball joints 22c and 22d in the vehicle front-rear direction is wider in the front-rear direction. It is therefore possible to effectively leave clearances between the inner shafts 22a and other members. Moreover, it is possible to position the upper and lower ball joints 22c and 22d substantially parallel to each other.

(4) The pair of Watt's linkage mechanisms FW and BW are disposed so as to be aligned in the front-rear direction, and each of the Watt's linkage mechanisms FW and BW includes: the pair of left and right rods 24a and 23b or 23a and 24b extending in the vehicle width direction; and the middle link 1F or 1B extending in the up-down direction and pivotally coupling inner end portions of the rods 24a and 23b or 23a and 24b in the vehicle width direction. The middle links 1F and 1B are characterized in that they are coaxial with each other (about the rotary shaft part 21e) and pivotally held on the vehicle body.

This configuration improves the attachment accuracy of the pair of Watt's linkage mechanisms FW and BW. Also, the left and right vehicle-width-direction outer end portions 22A and 22B of the pair of Watt's linkage mechanisms FW and BW move out of synchronization with the wheels but the middle part of the pair of Watt's linkage mechanisms FW and BW can be moved in synchronization with the vehicle body. This suppresses interference between the Watt's linkage mechanisms FW and BW due to excessive constraint of the vehicle-width-direction outer end portions 22A and 22B during an in-phase or reverse-phase movement while properly maintaining the position of the axle beam type suspension 10 in the vehicle width direction. This in turns enables smooth movements.

While the vehicle body structure according to the present embodiment has been described above, the present invention is not limited to this structure, and changes can be made as appropriate without departing from the gist of the present invention.

What is claimed is:

1. An axle beam type suspension comprising:
   a pair of trailing arms extending in a front-rear direction with respective front end sections supported on a vehicle body and respective rear end sections coupled to wheels;
   an axle beam extending in a vehicle width direction and coupling the pair of trailing arms to each other;
   a pair of Watt's linkage mechanisms extending in the vehicle width direction, coupling the pair of trailing arms to each other at a position rearward of the axle beam, and fixed at a middle part to the vehicle body; and
   a connection member connecting a vehicle-width-direction outer end portion of one of the pair of Watt's linkage mechanisms and a vehicle-width-direction outer end portion of an other of the pair of Watt's linkage mechanisms, wherein
   the pair of Watt's linkage mechanisms are disposed so as to be aligned in the front-rear direction, and
   the connection member is fixed to the trailing arms via an elastic member surrounding the connection member.

2. The axle beam type suspension according to claim 1, further comprising a bracket fixed to the rear end sections of the trailing arms and having a hollow portion, wherein
   the connection member is held in the hollow portion of the bracket via the elastic member surrounding the connection member.

3. The axle beam type suspension according to claim 1, wherein
   the connection member includes
      a body part which is held via the elastic member surrounding the body part;
      an upper coupling part which extends upward from the body part and to which the vehicle-width-direction outer end portion of the one of the pair of Watt's linkage mechanisms is coupled; and
      a lower coupling part which extends downward from the body part and to which the vehicle-width-direction outer end portion of the other of the pair of Watt's linkage mechanisms is coupled, and
   the upper coupling part and the lower coupling part are offset from each other in the front-rear direction.

4. The axle beam type suspension according to claim 1, wherein
   each of the pair of Watt's linkage mechanisms includes
      a pair of left and right rods extending in the vehicle width direction, and
      a middle link extending in an up-down direction and pivotally coupling inner end portions of the pair of left and right rods in the vehicle width direction, and
   the middle link of one of the pair of Watt's linkage mechanisms and the middle link of the other of the pair of Watt's linkage mechanisms are coaxial with each other and pivotally held on the vehicle body.

* * * * *